United States Patent

Shinbashi

[11] Patent Number: 5,805,568
[45] Date of Patent: Sep. 8, 1998

[54] ADD/DROP MULTIPLEXER FOR SUPPORTING FIXED LENGTH CELL

[75] Inventor: Masahiro Shinbashi, Kawasaki, Japan

[73] Assignee: Fujitsu Limited, Kanagawa, Japan

[21] Appl. No.: 627,141

[22] Filed: Apr. 3, 1996

[30] Foreign Application Priority Data

Sep. 25, 1995 [JP] Japan ................................. 7-246267

[51] Int. Cl.⁶ .................................................. H04J 3/26
[52] U.S. Cl. ........................ 370/223; 370/397; 370/446; 370/539
[58] Field of Search ................................. 370/395–397, 370/420, 421, 424, 425, 463, 535, 539, 541, 543, 505, 465, 466, 404, 405, 248, 220–224

[56] References Cited

U.S. PATENT DOCUMENTS

| | | | |
|---|---|---|---|
| 4,965,790 | 10/1990 | Nishino et al. | 370/535 |
| 5,103,447 | 4/1992 | Takiyasu et al. | 370/460 |
| 5,113,392 | 5/1992 | Takiyasu et al. | 370/465 |
| 5,265,088 | 11/1993 | Takigawa et al. | 370/535 |
| 5,495,484 | 2/1996 | Self et al. | 370/396 |

*Primary Examiner*—Chau Nguyen
*Attorney, Agent, or Firm*—Helfgott & Karas, P.C.

[57] ABSTRACT

In an add/drop multiplexing apparatus, a fixed length cell such as an ATM cell can be handled in addition to the existing data services. The add/drop multiplexing apparatus for supporting a fixed length cell is comprised of: an input unit for inputting multiplexed signals transmitted over a transmission path; a cross-connect unit for deriving a preset time slot signal from the multiplexed signals inputted by the input unit; and a tributary interface unit for converting the signal derived by the cross-connect unit into a signal having such a format corresponding to a low-ordered communication network. The tributary interface unit converts a fixed length cell received from the low-ordered communication network into a signal format processable by the cross-connect unit, and also converts the signal outputted from the cross-connect unit into a fixed length cell so as to be transmitted to the low-ordered communication network.

7 Claims, 11 Drawing Sheets

FIG. 6

| VC# | DESTINATION ID | PASS THROUGH |
|---|---|---|
| 100 | ---------- | Yes |
| 200 | C | No |

FIG. 8

| TIDs | VCCs |
|------|------|
| A | X |
| B | X |
| C | 200 |
| D | 200 |

ADD/DROP MULTIPLEXER FOR SUPPORTING FIXED LENGTH CELL

BACKGROUND OF THE INVENTION

1. Field of the Invention

The present invention relates to an add/drop multiplexing apparatus applicable to a synchronous network.

2. Description of the Related Art

Very recently, networks of optical transmission apparatuses are synchronized in conjunction with standardization of SONET(Synchronous Optical Network) and SDH (Synchronous Digital Hierarchy). A strong demand is rising for a continuity of service and flexibility in setting a line when a large-scaled network is established.

Furthermore, also as to data service to subscribers, after data is converted into an ATM cell having a fixed length, the resulting ATM cell is transmitted on a SONET network.

Currently, another demand has been made for establishing such an optical transmission apparatus capable of transmitting a SONET signal to a local area and a wide area by fetching data service other than the conventional service of the basic system and by mapping this data service on the SONET signal.

Conventionally, there is no practical optical transmission apparatus applicable to both the local area and the wide area. That is, since the apparatus for cross-connecting the STS signal level and the apparatus for routing the ATM cell utilize the apparatuses having the different specifications from each other, a commonly used apparatus for supporting both of these apparatuses has not yet been proposed.

Moreover, a protection switch is standardized at an STS signal level of a SONET. There are practically utilized the path protection type switch for monitoring the STS signal in unit of path, and the bidirectional line protection type switch initiated by an occurrence of a line failure. However, a protection switch at an ATM signal level has not yet been standardized, but also has not yet been used in the practical field.

SUMMARY OF THE INVENTION

The present invention has been made to solve the above-described problems, and therefore, has an object to provide an add/drop multiplexing apparatus capable of accepting a fixed length cell by which a local area network can be supported in addition to the existing services (DS1, DS3, STS-1 etc). That is, a first object of the present invention is to realize a service with flexibility.

A second object of the present invention is to provide a protection technique capable of responding to a fixed length cell for supporting a local area network.

To achieve the above-described objects, the present invention has been accomplished.

A first description will now be made of an apparatus capable of achieving the first object. That is, an add/drop multiplexing apparatus, according to the present invention, is comprised of: an input unit for inputting multiplexed signals transmitted over a transmission path; a cross-connect unit for deriving a preset time slot signal from the multiplexed signals inputted by the input unit; and a tributary interface unit for converting the signal derived by said cross-connect unit into a signal having such a format corresponding to a low-ordered communication network. The tributary interface unit converts a fixed length cell received from said low-ordered communication network into a signal format processable by said cross-connect unit, and also converts the signal outputted from said cross-connect unit into a fixed length cell so as to be transmitted to said low-ordered communication network. For instance, an optical fiber is employed as the transmission path. When an optical signal is converted into an electric signal at an STS-1 level at the input unit, in order to transmit the fixed length cell to the optical fiber, after the fixed length cell is mapped to the STS-1, the fixed length cell is electric-to-optical converted into the optical signal which will then be transmitted to the optical fiber.

Conversely, the optical signal transmitted by the optical fiber is converted into the electric signal at the input unit and then the electric signal is inputted into the cross-connect unit.

At this time, the signal at the DS3 level and the signal at the STS level are derived (DROP), or pass through (THROUGH), otherwise are inserted (ADD) at the cross-connect unit. The electric signal produced by mapping the fixed length cell passes through the cross-connect unit, and is dropped, passes through, or is added at the tributary interface unit. To this end, the tributary interface unit owns the VC table for registering therein the virtual channel (VC) used by the low-ordered communication network in order to communicate the fixed length cell through the virtual channel. Then, the tributary interface unit drops, or passes through the fixed length cell received with reference to this VC table.

That is, the tributary interface unit includes: the VC table; a signal terminal unit for converting the signal outputted from said cross-connect unit into the fixed length cell; a routing tag assembling unit for deriving a virtual channel discriminator from a header portion of the fixed length cell outputted from said signal terminal unit, for comparing the derived virtual channel discriminator with the virtual channel registered in said VC table, and for adding a routing tag indicative of said low-ordered communication network as a destination to said fixed length cell when both of said virtual channels are coincident with each other; a routing device for investigating the routing tag of the fixed length cell outputted from said routing tag assembling unit so as to judge whether or not the destination of said fixed length cell is said low-ordered communication network, for transferring said fixed length cell to said low-ordered communication network when the destination of said fixed length cell is said low-ordered communication network, and for returning (passing through) said fixed length cell to said routing tag assembling unit when the destination of said fixed length cell is not said low-ordered communication network; and a routing tag disassembling unit for removing the routing tag from the fixed length cell to be transmitted from said routing device to said low-ordered communication network.

When the fixed length cell is returned from said routing device, said routing tag assembling unit removes the routing tag from said fixed length cell, and returns the fixed length cell whose routing tag has been removed to said cross-connect unit.

To achieve the second object, while a plurality of add/drop multiplexing apparatuses are connected by way of a transmission path for a present operation system and a transmission path for a spare operation system in a ring shape to constitute a communication network, each of said add/drop multiplexing apparatuses is comprised of: a signal terminal unit/a routing tag assembling unit used for said transmission path for the present operation system; and a signal terminal unit/a routing tag assembling unit used for said transmission path for the spare operation system.

When such a fixed length cell for designating said low-ordered communication network as a destination is inputted from the signal terminal unit used for the transmission path for said present operation system, the routing tag assembling unit used for the transmission path for the present operation system attaches such a routing tag for indicating the low-ordered communication network as the destination to said fixed length cell.

To the contrary, when such a fixed length cell for designating said low-ordered communication network as a destination is inputted from the signal terminal unit used for the transmission path for said spare operation system, the routing tag assembling unit used for the transmission path for the spare operation system attaches to said fixed length cell such a routing tag for indicating that said fixed length cell is discarded.

At this time, when the fixed length cell outputted from the routing tag assembling unit used for the transmission path for the present operation system is inputted, the routing device confirms that the destination is directed to the low-order communication network by referring to the routing tag of this fixed length cell. Then, the routing device transfers the inputted ATM cell to the low-ordered communication network. On the other hand, when the fixed length cell outputted from the routing tag assembling unit used for the transmission path for the spare operation system is inputted, the routing device confirms that this fixed length cell should be discarded by referring to the routing tag of this fixed length cell. Then, the routing device discards the inputted fixed length cell.

It should be understood that when the failure happens to occur in the transmission path for the present operation system, the present operation system may be switched into the spare operation system by replacing the content of the routing tag assembled in the routing tag assembling unit used for the transmission path for the present operation system by the content of the routing tag assembled in the routing tag assembling unit used for the transmission path for the spare operation system.

Furthermore, each of the add/drop multiplexing apparatuses may own such a ring topology map for recording therein the positional information of the add/drop multiplexing apparatuses present on the transmission path along the transmission direction of the transmission path on the present operation system side. For instance, when the communication network is constituted by connecting the four add/drop multiplexing apparatuses in a ring shape, namely, the add/drop multiplexing apparatus A, the add/drop multiplexing apparatus B, the add/drop multiplexing apparatus C, and the add/drop multiplexing apparatus D, the ring topology map of the add/drop multiplexing apparatus A becomes B-C-D. The ring topology map of the add/drop multiplexing apparatus B becomes C-D-A. Further, the ring topology map of the add/drop multiplexing apparatus C becomes D-A-B. The topology map of the add/drop multiplexing apparatus becomes A-B-C.

Also, each of the add/drop multiplexing apparatuses may include a switch map for registering such information used to specify whether or not the present operation system needs to be switched by the spare operation system when a failure happens to occur in each of said add/drop multiplexing apparatuses with respect to each of add/drop multiplexing apparatus identification information used to identify said respective add/drop multiplexing apparatuses.

Furthermore, each of said add/drop multiplexing apparatuses may include a failure detecting unit for judging that a failure happens to occur in such an add/drop multiplexing apparatus located on a down stream side among the adjoining add/drop multiplexing apparatuses when said failure detecting unit detects an insufficient synchronization of the fixed length cell received by said tributary interface unit, and refers to said ring topology map; a failure occurrence notifying unit for transmitting to said communication network, an OAM cell for recording therein add/drop multiplexing identification information used to specify the add/drop multiplexing apparatus located on the down stream side when said failure detecting unit judges that the failure happens to occur in said add/drop multiplexing apparatus on the down stream side; and a transmission path switching unit for deriving the add/drop multiplexing apparatus identification information from said OAM cell when the OAM cell is transferred from another add/drop multiplexing apparatus, for retrieving said switch map while using said add/drop multiplexing apparatus identification information as a keyword, and for substituting a content of a routing tag assembling unit used in the transmission path for the present operation system by a content of a routing tag assembled by said routing tag assembling unit used in the transmission path for the spare operation system.

BRIEF DESCRIPTION OF THE DRAWINGS

A more complete understanding of the present invention may be gained by reading the subsequent detailed description with reference to the drawings, in which:

FIG. 6 shows a concrete example of a VC table;

FIG. 8 represents a concrete example of a switch map;

DETAILED DESCRIPTION OF THE PREFERRED EMBODIMENTS

Referring now to drawings, a description will be made of various preferred embodiments according to the present invention.

In accordance with an embodiment, SONET-ADM (Synchronous Optical Network-Add/Drop Multiplexing) apparatus as a concrete example of an add/drop multiplexing apparatus of the present invention will now be described. Then, a network to which the SONET-ADM apparatus is applied is explained with reference to FIG. 1.

Figure 1:
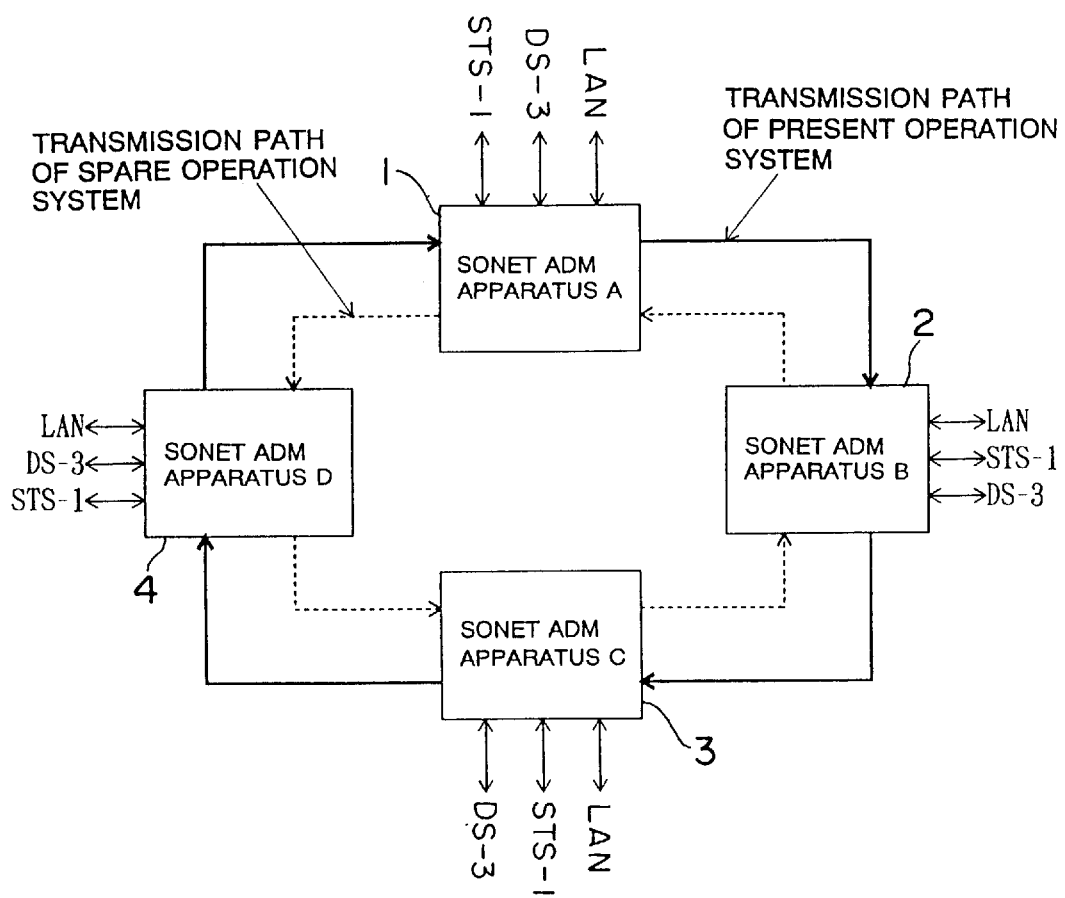
FIG. 1 is a schematic block diagram for representing a structure of a network to which a SONET-ADM apparatus according to an embodiment of the present invention is applied.

As indicated in FIG. 1, according to this embodiment, an optical fiber whose communication protocol is OC-3 (optical carrier level 3) is employed as a transmission path, and four sets of SONET-ADM apparatuses "A" to "D" (1 to 4) are connected via this optical fiber to each other, by which ring topology may be formed. The optical fiber is comprised of an optical fiber for a present operation system, and an optical fiber for a spare operation system. Then, the transmission direction of the optical fiber for the present operation system is opposite to that of the optical fiber for the spare operation system.

Each of the SONET-ADM apparatuses A to D (1 to 4) transmits/receives a signal by using the optical fiber for the present operation system during the normal condition, and transmits/receives a signal by employing the optical fiber for the spare operation system when a failure happens to occur.

Furthermore, a local area network (will be referred to as a "LAN" hereinafter) is connected to the respective SONET-ADM apparatuses A to D (1 to 4) in addition to a communication network of a DS-3 (digital signal level 3) and an STS-1 (synchronous transport signal level 1).

An internal arrangement of the SONET-ADM apparatus A(1) will now be explained with reference to FIG. 2.

Figure 2:
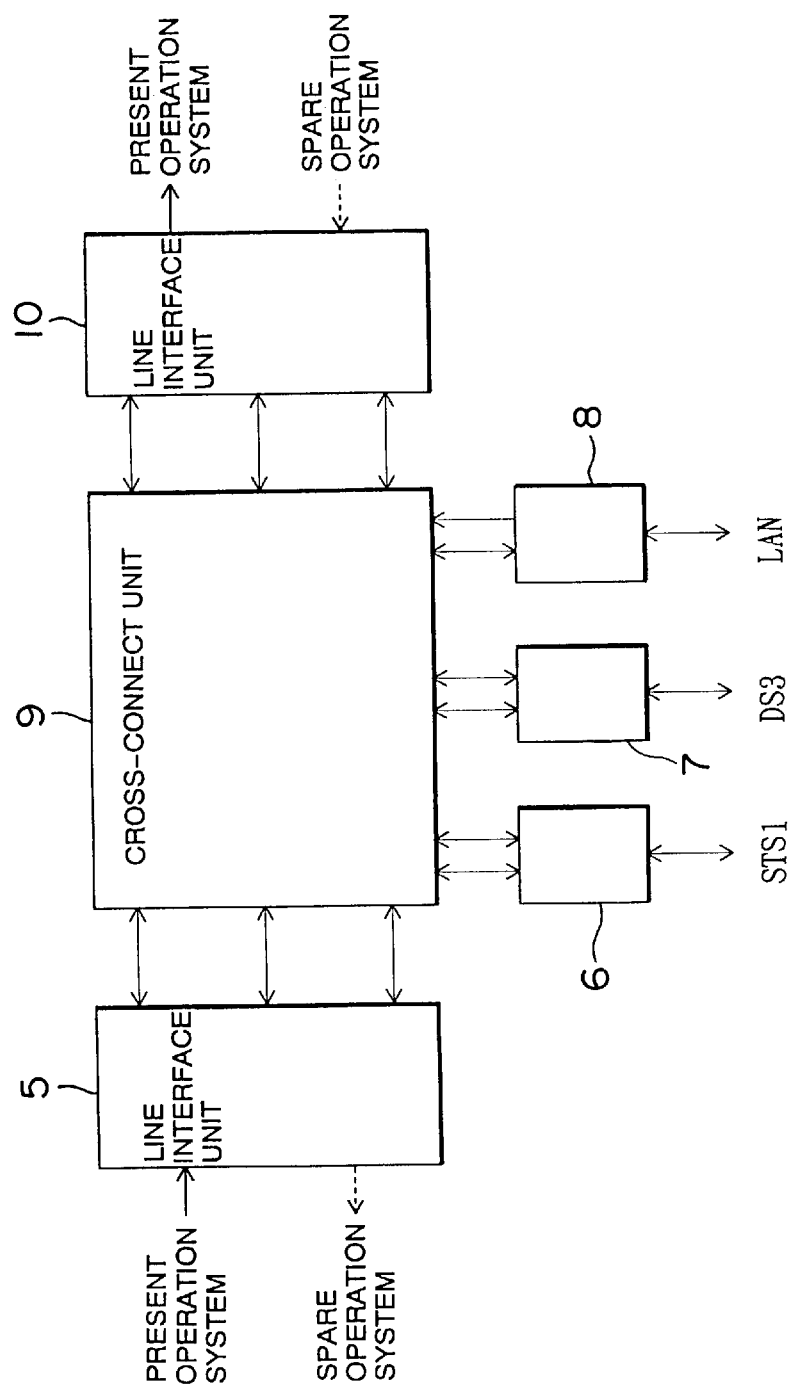
FIG. 2 is a block diagram for showing an internal arrangement of the SONET-ADM apparatus shown in FIG. 1.

As represented in FIG. 2, the SONET-ADM apparatus A(1) is equipped with a cross-connect unit 9, and line interface units 3 and 5 provided at connection portions between this cross-connect unit 9 and the optical fiber. In this drawing, the line interface unit 5 is provided at an input portion of the optical fiber for the present operation system (output portion of optical fiber for spare operation system) of the cross-connect unit 9, and also the line interface unit 10 is provided at an output portion of the optical fiber for the present operation system (input portion of optical fiber for spare operation system). It should be understood in this specification that the line interface units 5 and 10 are connected to the cross-connected unit 9 by way of signal lines at the STS-1 level.

Each of the line interface units 5 and 10 converts the OC-3 signals received from the optical fiber for the present operation system and the optical fiber for the spare operation system into the STS-1 signals, and inputs the STS-1 signal to the cross-connect unit 9. Furthermore, the respective line interface units 5 and 10 convert the STS-1 signal outputted from the cross-connect unit 9 into the OC-3 signal and send this OC-3 signal to the optical fiber.

Additionally, in the SONET-ADM apparatus A(1), a tributary interface unit 7 for DS3 is provided at a connection portion between the cross-connect unit 9 and a DC3 line. A tributary interface unit 6 for an STS-1 is provided at a connection portion between the cross-connect unit 9 and the STS-1 line, and a tributary interface unit 8 for a LAN is provided at a connection portion between the cross-connect unit 9 and the LAN.

The tributary interface units 6 to 8 select a predetermined time slot from a multiplexed signal acquired from the line interface units 5 and 10, derive a signal stored in the selected time slot, and convert this derived signal into such a signal with a signal format depending upon the respective communication protocols. The tributary interface units 6 to 8 convert the DS-3 signal, the STS-1 signal, and the LAN signal into the STS-1 signal to thereby write this converted STS-1 signal into a preselected time slot of the multiplexed signal.

Although not shown in this drawing, the tributary interface unit 7 for the DS3 is arranged by a selector, an STS terminal unit, and a line terminal unit.

The selector selects the signal transmission to either the optical fiber for the present operation system, or the optical fiber for the spare operation system. The selector also selects the signal reception from either the optical fiber for the present operation system, or the optical fiber for the spare operation system.

The STS terminal unit terminals the STS-1 signal outputted from the selector, and converts this STS-1 signal into a signal in a DS3 format. The STS terminal unit converts the DS3 type signal received by the line terminal unit into the signal in the STS-1 format which will then be transferred to the selector.

The line terminal unit transmits/receives a signal supplied to a DS3 communication line.

The tributary interface unit 7 for the STS is arranged by a selector and a line terminal unit.

The selector selects the signal transmission to either the optical fiber for the present operation system, or the optical fiber for the spare operation system. The selector also selects the signal reception from either the optical fiber for the present operation system, or the optical fiber for the spare operation system.

The line terminal unit transmits the STS-1 signal outputted from the selector to an STS-1 communication line. The line terminal unit also transfers the STS-1 signal received from the STS-1 communication line to the selector.

Figure 3:
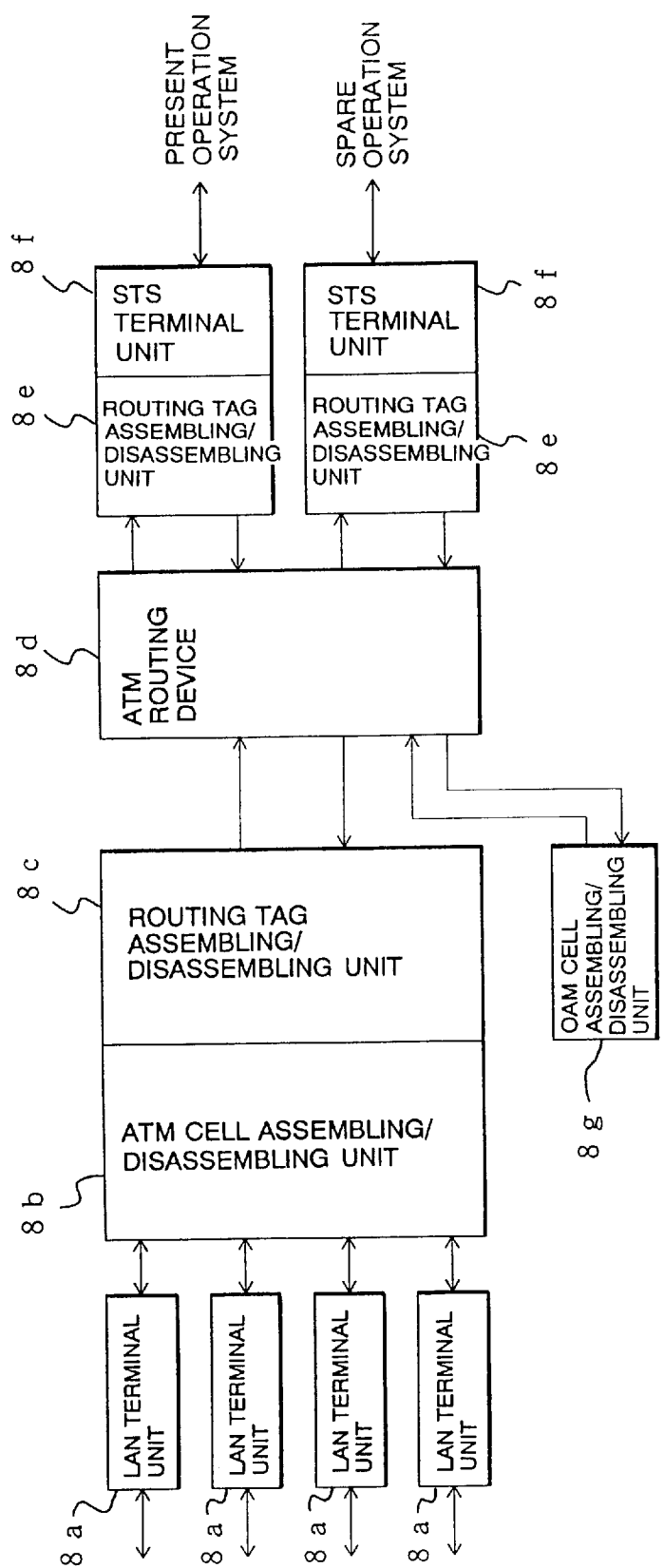
FIG. 3 is a block diagram for indicating an internal arrangement of a tributary interface unit for a LAN.

Furthermore, in the tributary interface unit 8 for the LAN, as indicated in FIG. 3, a plurality of LAN communication lines are connected, and LAN terminal units 8a are provided at connection portions thereof. Then, an ATM cell assembling/disassembling unit 8b is connected to the LAN terminal unit 8a, and a routing tag assembling/disassembling unit 8c is connected to this ATM cell assembling/disassembling unit 8b. Furthermore, an ATM routing device 8d is connected to the routing tag assembling/disassembling unit 8c, and two sets of routing tag assembling/disassembling units 8e are connected to this ATM routing device 8d. An STS terminal unit 8f is connected to each of the routing tag assembling/disassembling units 8e, and the cross-connect unit 9 is connected via the signal line of the STS-1 level to this STS terminal unit 8f. It is now assumed that among the two STS terminal units 8f, one STS terminal unit 8f is connected to the STS-1 signal line connected to the optical fiber for the present operation system, whereas the other STS terminal unit 8f is connected to the STS-1 signal line connected to the optical fiber for the spare operation system.

To transmit a signal, the ATM cell assembling/disassembling unit 8b converts a signal received by the LAN terminal unit 8a into an ATM cell. To receive a signal, this ATM cell assembling/disassembling unit 8b disassembles the ATM cell received from the routing tag assembling/disassembling unit 8c to thereby produce a signal adaptive to the LAN.

The routing tag assembling/disassembling unit 8c attaches, or adds a routing tag to the ATM cell produced by the ATM cell assembling/disassembling unit 8b when a signal is transmitted. This routing tag is determined based upon a destination of an ATM cell and failure information of the SONET, and corresponds to such information used to instruct whether the ATM cell with the routing tag is transmitted to the optical fiber for the present operation system, or the optical fiber for the spare operation system. Upon receipt of the ATM cell with the routing tag from the ATM routing device 8d, the routing tag assembling/disassembling unit 8c removes the routing tag and transfers this routing tag to the ATM cell assembling/disassembling unit 8b when the signal is received. This routing tag is such information used to designate a destination of the LAN.

Upon receipt of the ATM cell with the routing tag from the routing tag assembling/disassembling unit 8c, the ATM routing device 8d routes the signal to be transmitted to any one of these two routing tag assembling/disassembling units 8e with reference to the routing tag when the signal is transmitted. Then, when the ATM cell with the routing tag sent from any one of the routing tag assembling/disassembling unit 8e is received, the ATM routing device 8d switches the operations during the signal reception with reference to the routing tag as follows: The ATM cell is transferred to the routing tag assembling/disassembling unit 8c, the ATM cell is transferred to an OAM cell assembling/disassembling unit 8g, or the ATM cell is again returned to the routing tag assembling/disassembling unit 8e. In other words, the routing tag assembling/disassembling unit 8e judges whether or not the received signal corresponds to the OAM cell with reference to a channel value of this received signal if this channel value is equal to a preset channel value. Then, if this signal corresponds to the OAM cell, then the routing tag assembling/disassembling unit 8g attaches to this signal such a routing tag whose destination is the OAM cell assembling/disassembling unit 8g. On the other hand, if this signal is not equal to the OAM cell, then the routing tag assembling/disassembling unit 8g attaches to this signal such a routing tag which designates the LAN corresponding to the destination of this signal. Moreover, in the case that the channel value of the received signal is not coincident with a preselected channel value, the routing tag assembling/disassembling unit 8e attaches to the signal such a routing tag whose destination is the routing tag assembling/disassembling unit 8e in order that this SONET-ADM apparatus (A)1 passes through. As a result, the ATM routing device 8d may switch the operations with reference to the routing tag as follows. That is, the ATM cell is transmitted to the routing tag assembling/disassembling unit 8c, to the OAM cell assembling/disassembling unit 8g, or to the routing tag assembling/disassembling unit 8e. It should be noted that among the two routing tag assembling/disassembling units 8e, routing tag assembling/disassembling unit 8e employed in the present operation system attaches the routing tag specific to the LAN for destination, whereas the routing tag assembling/disassembling unit 8e employed in the spare operation system attaches the routing tag for discarding the signal.

As explained above, the routing tag assembling/disassembling unit 8e performs the attaching process of the routing tag when the signal is received, whereas the routing tag assembling/disassembling unit 8e receives the ATM cell with the routing tag from the ATM routing device 8d and removes the routing tag from this ATM cell when the signal is transmitted.

Upon receipt of the ATM cell from the routing tag assembling/disassembling unit 8e, the STS terminal unit 8f disassembles this ATM cell to be converted into the STS-1 type signal which will then be transmitted during the signal transmission. When the signal is received, the STS terminal unit 8f converts the STS-1 type signal received from the cross-connect unit 9 into the ATM cell.

The OAM cell assembling/disassembling unit 8g produces an OAM cell containing failure occurrence information when a failure or malfunction happens to occur in the received ATM cell (when insufficient synchronization of ATM cell happens to occur). In the case that failure occurrence information is received from other SONET-ADM apparatus, a CPU (not shown in detail) employed in the SONET-ADM apparatus decodes this OAM cell into a processable data format.

Next, a description will now be made of an ATM protection function of the SONET-ADM apparatus A(1).

Figure 4:
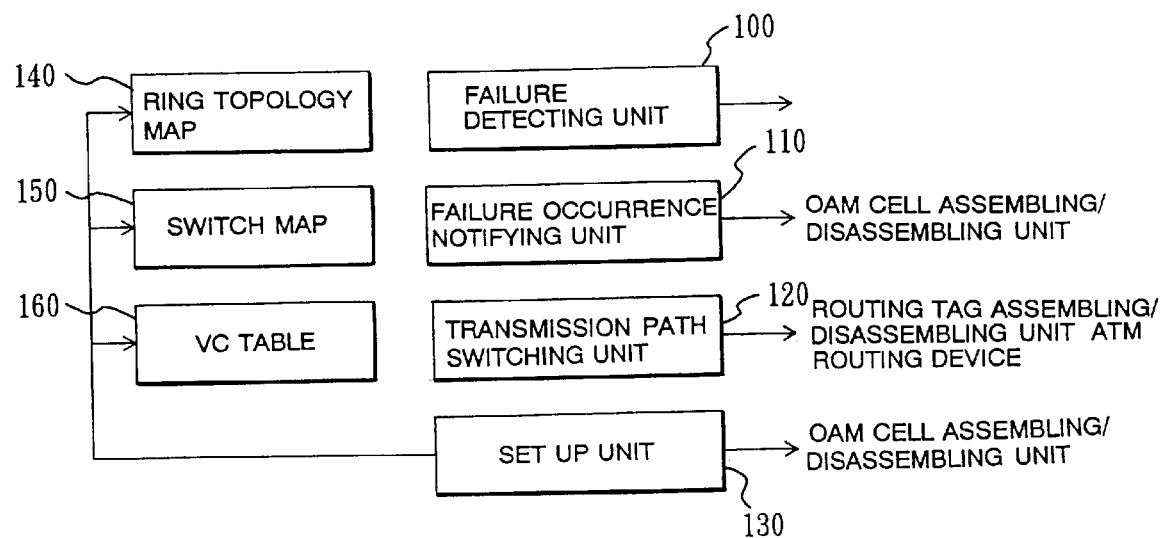
FIG. 4 schematically illustrates functional arrangements of a protection system employed in the SONET-ADM apparatus of FIG. 1.

FIG. 4 is a block diagram for representing sorts of functions realized by executing an application program stored in a memory by a CPU of the SONET-ADM apparatus A(1).

As indicated in FIG. 4, the SONET-ADM apparatus A(1) includes a failure detecting unit 100, a failure occurrence notifying unit 110, a transmission path switching unit 120, a set up unit 130, a ring topology map 140, a switch map 150, and a VC table 160.

The failure detecting unit 100 monitors the ATM cell received by the tributary interface unit 8 for the LAN in order to detect insufficient synchronization of the ATM cell. Then, when the insufficient synchronization of the ATM cell is detected, the failure detecting unit 100 judges that a failure happens to occur either within the SONET-ADM apparatus located adjacent to the own SONET-ADM apparatus A(1) along the down stream direction, or in the optical fiber between this SONET-ADM and the own SONET-ADM apparatus A(1).

Figure 5:
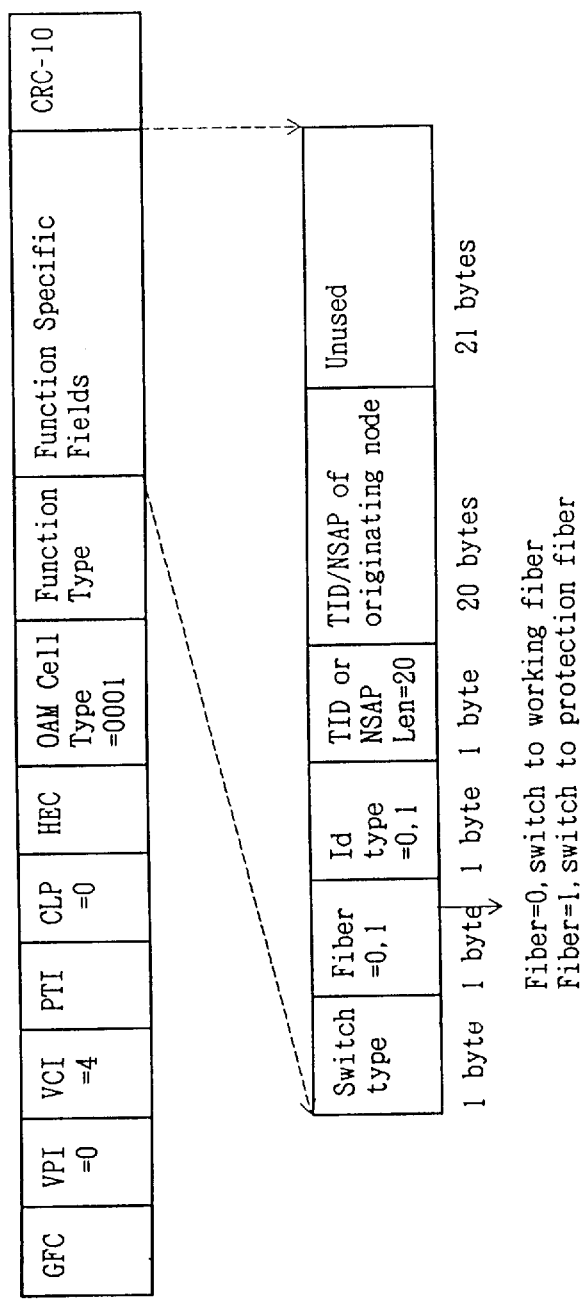
FIG. 5 indicates a concrete example of a ring map PDU.

When the failure detecting unit 100 detects an occurrence of a failure, the failure occurrence notifying unit 110 notifies this occurrence of the failure to other SONET-ADM apparatuses. Concretely speaking, when the failure detecting unit 100 detects that the failure happens to occur in the SONET-ADM apparatus positioned along the down stream direction, the failure occurrence notifying unit 110 notifies the TID of this SONET-ADM apparatus to the OAM cell assembling/disassembling unit 8g and notifies the occurrence of this failure to other SONET-ADM apparatuses. At this time, the OAM cell assembling/disassembling unit 8g produces both an OAM cell for failure information and another OAM cell for a protection switch, and inserts these OAM cells into a channel for managing the optical fiber. As the OAM cell for failure information, there are an OAM cell containing an alarm display signal AIS to be transmitted to the down stream side of the optical fiber for the present operation system, and another OAM cell containing a local terminal reception failure signal FERF to be transmitted to the up stream side of the optical fiber for the present operation system. Then, the OAM cell for the protection switch is arranged in function specific fields of the OAM cell as shown in FIG. 5 by a "Switch type" for storing sorts of protection switches (switching from present operation system to spare operation system due to failure occurrence, forcible switching from present operation system to spare operation system in response to command, recovery from spare operation system to present operation system in response to command, recovery from spare operation system to present operation system when SONET-ADM apparatus is recovered from failure, and the like); a "Fiber" for storing information used to specify an optical fiber where a failure happens to occur (optical fiber for present operation system, or optical fiber for spare operation system); and an "ID-type" for storing information used to identify whether the TID is stored, or the NSAP is stored. This OAM cell for the protection switch is further constructed of a "TID or NSAP Length" for storing information used to indicate a length of "TID/NSAP of originating node" for storing the TID of the SONET-ADM apparatus for originally issuing the OAM cell; the above-described "TID/NSAP of originating node"; and "Unused" of an unused region.

The transmission path switching unit 120 switches the signal reception path from the present operation system to the spare operation system in the case that a failure happens to occur on the signal transmission path defined from the SONET-ADM apparatus of a counter party under communication to the own node.

As indicated in FIG. 6, the VC table 160 is such a table for registering destination information and pass through discrimination information with respect to each of channels multiplexed to the optical fiber at the OC-3 level. The destination information corresponds to information used to identify a SONET-ADM apparatus communicated as a counter party by using this channel, and SONET-ADM apparatus identification information (TID) of the SONET-ADM apparatus of the counter party is registered. The pass through identification information corresponds to such information used to identify whether the signals transmitted through the respective channels are acquired within the own node ("drop"), or these signals pass through the own node ("through"). When the signals are dropped, "No" is registered, whereas when the signals pass through, "YES" is registered as the pass through identification information. For instance, in the case that channels "100" and "200" are multiplexed to the optical fiber at the OC-3 level, and both the SONET-ADM apparatus A(1) and the SONET-ADM apparatus C(3) communicated with each other by using the channel "200", no information is registered in the destination information of the channel "100", and "YES" is registered in the pass through identification information in the VC table 160 of the SONET-ADM apparatus A(1). On the other hand, in the VC table 160 of the SONET-ADM apparatus C(3), the TID "C" is registered to the destination information of the channel "200", and "NO" is registered to the pass through identification information.

Figure 7:
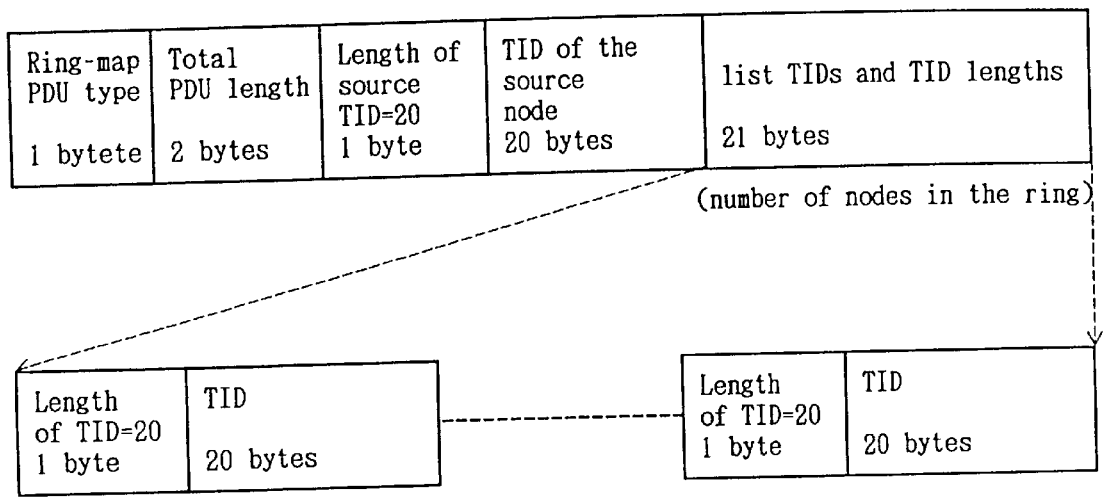
FIG. 7 denotes a concrete example of a protection OAM cell.

The ring topology map 140 is such a map for representing a transmission path of an optical fiber for a present operation system of a SONET. For example, in FIG. 1, the transmission direction of the optical fiber for the present operation system is defined by from the SONET-ADM apparatus A(1) via the SONET-ADM apparatus B(2), SONET-AM apparatus C(3), and the SONET-ADM apparatus D(4) to the SONET-ADM apparatus A(1). In the ring topology map of the SONET-ADM apparatus A(1), "B-C-D" is registered. Then, in the topology map of the SONET-ADM apparatus B(2), "C-D-A" is registered. Also, in the ring topology map of the SONET-ADM apparatus C(3), "D-A-B" is registered. Furthermore, in the ring topology map of the SONET-ADM apparatus D(4), "A-B-C" is registered. This ring map topology is set when the ring topology map of the SONET is set up. This setting method is carried out by circulating a protocol data unit called as a "ring map PDU" in a management channel previously secured on an optical fiber. This ring map PDU is constructed of, as shown in FIG. 7, an information region for indicating a sort of protocol data unit (Ring-map PDU type), an information region for representing a length of the protocol data unit (Total PDU length), and a source SONET-ADM apparatus identification information region for identifying a source SONET-ADM apparatus of a protocol data unit (TID of the source node). This ring map topology is further arranged by a length information region for denoting a length of this source SONET-ADM apparatus identification information region (Length of source TID), and a SONET-ADM apparatus list region indicative of a list of the SONET-ADM apparatuses existing on the optical fiber at the OC-3 level. In the SONET-ADM apparatus list region, the SONET-ADM apparatus identification information region (TID) of the respective SONET-ADM apparatuses and also the length region (Length of TID) representative of the length of this SONET-ADM apparatus identification information region (TID).

When the ring map PDU is transmitted, each of the SONET-ADM apparatuses writes the own SONET-ADM apparatus identification information (TID) into the source SONET-ADM apparatus identification information region (TID of the source code) of the ring map PDU format, and further the length of the SONET-ADM apparatus identification information (TID) into the length information region (Length of source TID). Then, the SONET-ADM apparatus inserts the ring map PDU into the management channel for the multiplexed optical fiber so as to transmit this ring map PDU on the SONET. Upon receipt of the ring map PDU, other SONET-ADM apparatuses writes the SONET-ADM apparatus identification information TID of the own node into the last region of the SONET-ADM apparatus list region (list TIDs and TID lengths) and inserts this SONET-ADM apparatus identification information TID into the management channel.

As described above, the ring map PDU is returned via a plurality of SONET-ADM apparatuses operated on the SONET to the source SONET-ADM apparatus. When the ring map PDU transmitted from the own node is received, the source SONET-ADM apparatus reads out the list of the SONET-ADM apparatus identification information (TID) from the SONET-ADM apparatus list region (list TIDs and TID lengths) of this ring map PDU, and thereafter discards the ring map PDU. Then, the source SONET-ADM apparatus produces the ring topology map 140 in accordance with the list of the SONET-ADM apparatus identification information (TID). Such a process operation is executed by the set up unit 130 when the SONET is set up, a new node is additionally provided, or every time when a preselected time period has elapsed.

Figure 8:
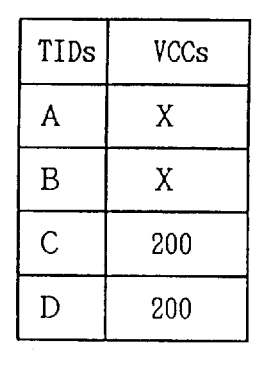

The switch map 150 is such a map for storing therein information used to switch the present operation system and the spare operation system in the case that a failure happens to occur on an optical fiber. A concrete example of this switch map 150 is indicated in FIG. 8. It is assumed that the switch map indicated in FIG. 8 is the switch map of the SONET-ADM apparatus A(1), and corresponds to the VC table 160 of FIG. 6. In this case, transmission path switching information (VCCs) has been registered with respect to each of the TIDs of the SONET-ADM apparatuses existing on the SONET. The transmission path switch information (VCCs) corresponds to such information used to identify whether or not the signal transmission path from the communication counter party to the own node is interrupted when the failure happens to occur in the relevant SONET-ADM apparatus. With regard to the SONET-ADM apparatus whose signal transmission path is interrupted, the channels used by the own node and the SONET-ADM apparatus functioning as the communication counter party are registered as the transmission path switching information. For example, while the SONET-ADM apparatus A(1) communicates with the SONET-ADM apparatus C(3) by using the channel 200, there exist the SONET-ADM apparatus C(3) and the SONET-ADM apparatus A(1) on the signal transmission path defined from the SONET-ADM apparatus C(3) to the SONET-ADM apparatus D(4). As a consequence, when a failure happens to occur in either the SONET-ADM apparatus C(3), or the SONET-ADM apparatus D(4), the signal transmission path from the SONET-ADM apparatus C(3) to the SONET-ADM apparatus A(1), so that the signal transmission path must be switched. Then, the channel value "200" is registered in the transmission path switching information columns about the SONET-ADM apparatus C(3) and the SONET-ADM apparatus D(4) on the switch map 150. No channel value is registered in the transmission switch information columns of the SONET-ADM apparatuses other than these SONET-ADM apparatus C(3) and SONET-ADM apparatus D(4). When a failure happens to occur in a certain SONET-ADM apparatus, the transmission path switching unit 120 retrieves the switch map 120 by using TID of this SONET-ADM apparatus as the keyword to thereby judge whether or not the channel value is registered in the transmission path switching information column. Then, if the channel value is registered in the transmission path switching information column, then the switching operation is carried out between the present operation system and the spare operation system. The transmission path is switched by switching the contents of the routing tags to be attached by the routing tag assembling/disassembling unit 8e. That is, the content of the routing tag to be attached by the routing tag assembling/disassembling unit 8e of the spare operation system is substituted for the content of the routing tag already attached by the routing tag assembling/disassembling unit 8e of the present operation system. For instance, the routing tag assembling/disassembling unit 8e of the present operation system attaches such information used to specify a LAN destination with respect to the received ATM cell as a routing tag, whereas the routing tag assembling/disassembling unit 8e of the spare operation system attaches to the received ATM cell, such information used to discard this ATM cell as the routing tag. When the present operation system must be switched to the spare operation system due to the occurrence of the failure, the routing tag assembling/disassembling unit 8e of the present operation system attaches to the received ATM cell, such information used to discard this ATM cell as the routing tag, whereas the routing tag assembling/disassembling unit 8e of the spare operation system attaches to the received ATM cell the information used to specify the LAN destination as the routing tag.

Operations and effects of the above-explained SONET-ADM apparatus according to this embodiment will now be described.

First, each of the SONET-ADM apparatuses initiates the set up unit 130 when the SONET is set up.

The set up unit 130 executes both the process to form the ring topology map 140 and the process to form the VC table 160.

The process operation to form the ring topology map 140 will be firstly explained.

To form the ring topology map, the set up unit 130 writes the TID of the own node into the source SONET-ADM apparatus identification information region (TID of source node) of the ring map PDU format and transmits this TID of the own node to the SONET. On the other hand, when the ring map PDU is received from the SONET-ADM apparatus located along the down stream, the set up unit 130 judges as to whether this ring map PDU is transmitted from the own node, or transmitted from the SONET-ADM apparatus. In other words, the set up unit reads out the TID from the source SONET-ADM apparatus identification information region (TID of source node) of the received ring map PDU and compares this read TID with the own TID. Then, when the read TID is coincident with the own TID, the set up unit judges that the above-explained ring map PDU is transmitted from the own node, and then reads out the list of he TIDs from the SONET-ADM apparatus list region (list TIDs and TID lengths) of the ring map PDU, and thereafter discards this ring map PDU. Thus, the ring topology map based upon the list of the TIDs read from the ring map PDU is produced. On the other hand, when the own TID is not coincident with the TID of the source SONET-ADM apparatus identification information region (TID of source node) of the ring map PDU, the SONET-ADM apparatus writes the own TID into the last region of the SONET-ADM apparatus list region (list TIDs and TID lengths) of the ring map PDU, and transmits this own TID to the SONET. With such a process operation, the ring topology map of the SONET-ADM apparatus A(1) becomes "B-C-D", the ring topology map of the SONET-ADM apparatus B(2) becomes "C-D-A", the ring topology map of the SONET-ADM apparatus C(3) becomes "D-A-B", and the ring topology map of the SONET-ADM apparatus D(4) becomes "A-B-C".

Subsequently, a description will now be made of the process operation to form the VC table 160.

This process operation of the VC table 160 is executed in response to a command entered by an operator. That is, the operation of each SONET-ADM apparatus inputs the number of all channels multiplexed on the SONET, the SONET-ADM apparatus identification information of the communication counter party, and the number of channels used between this SONET-ADM apparatus of the communication counter party and the own SONET-ADM apparatus. Then, the set up unit 130 registers the umber of all channels into the VC table format. Next, the et up unit 130 writes the SONET-ADM apparatus identification information (TID) of the counter party into the destination information region of the channel under use based upon the number of used channel and the SONET-ADM apparatus identification information (TID) of the counter party, and also writes "NO" into the pass through identification information of the used channel. Furthermore, the set up unit 130 registers no information in the channel destination information region except for the channel under use, and writes "YES" into the pass through identification region.

Figure 9:
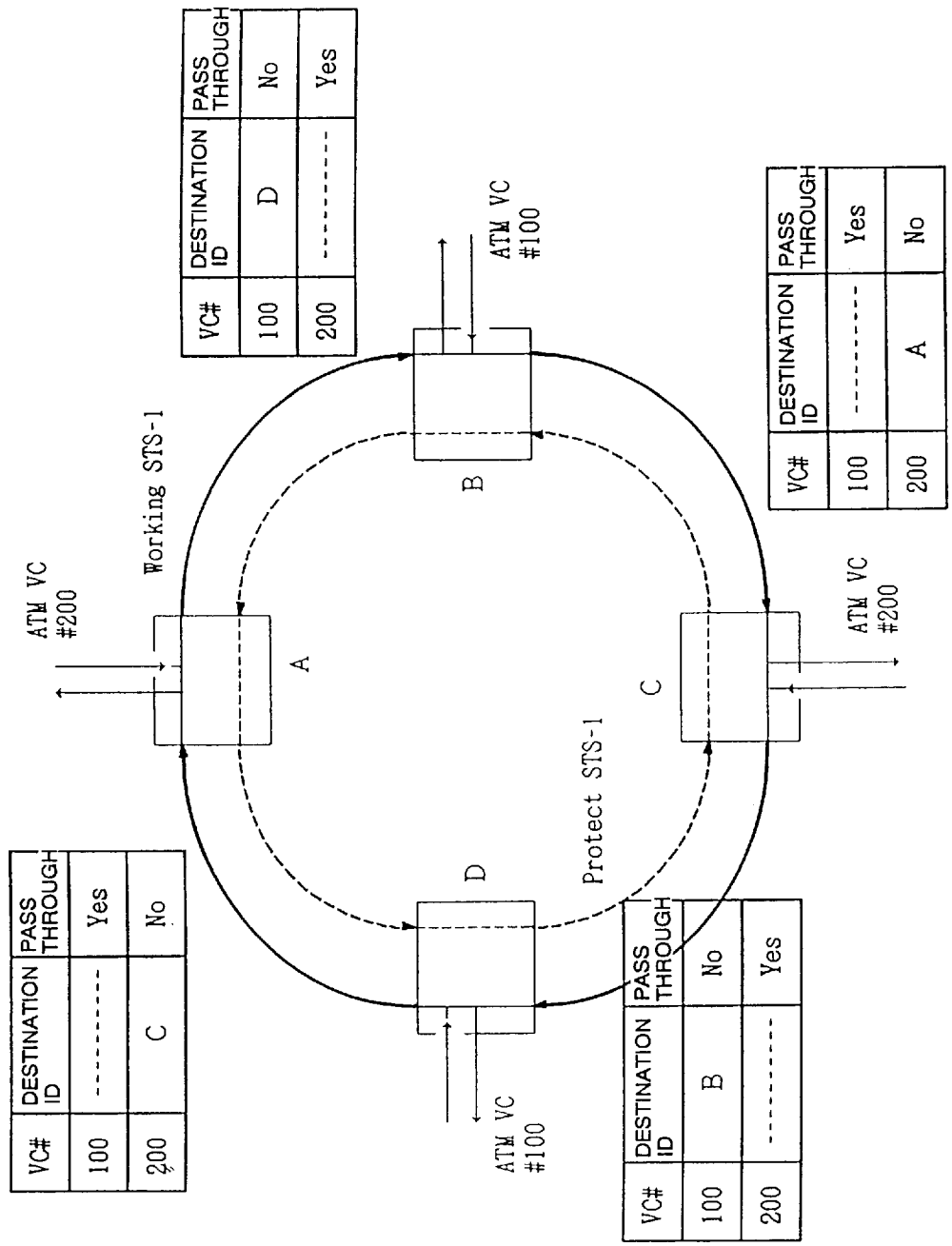
FIG. 9 shows a concrete example of a VC table set on the SONET.

For instance, in the case that both the SONET-ADM apparatus A(1) and the SONET-ADM apparatus C(3) communicate with each other by using the channel "200", and also both the SONET-ADM apparatus B(2) and the SONET-ADM apparatus D(4) communicate with each other by using the channel "100", in the VC table of the SONET-ADM apparatus A(1), as represented in FIG. 9, the TID "C" of the SONET-ADM apparatus C(3) is registered into the destination information region of the channel "200", whereas "NO" is registered into the pass through identification information region. In connection thereto, in the VC table of the SONET-ADM apparatus C(3), the TID "A" of the SONET-ADM apparatus A(1) is registered into the destination information region of the channel "200", and "NO" is registered in the pass through identification information region. Also, in the VC table of the SONET-ADM apparatus B(2), the TID "D" of the SONET-ADM apparatus D(4) is registered into the destination information region of the channel "100", and "NO" is registered into the pass through identification information region. Then, in the VC table of the SONET-ADM apparatus D(4), the TID "B" of the SONET-ADM apparatus B(2) is registered into the destination information region of the channel "100", and "NO" is registered in the pass through identification information region.

When setting of the topology ring map 140 and the VC table 160 is complete, the set up unit 130 forms the switch map 150. First, the set up unit 130 registers the TID of the SONET-ADM apparatus existing in the SONET into the format of the switch map 150. Then, the set up apparatus 130 judges whether or not the SONET-ADM apparatus is present on the signal transmission path from the SONET-ADM apparatus of the counter party with reference to the topology map, and registers the value of the channel under use into the transmission path switching information column of this judged SONET-ADM apparatus. For instance, the SONET-ADM apparatus A(1) is communicated with the SONET-ADM apparatus C(3) by using the channel "200". In this case, the SONET-ADM apparatus C(3) and the SONET-ADM apparatus D(4) are present on the signal transmission path defined from the SONET-ADM apparatus C(3) to the SONET-ADM apparatus A(1). Then, in the switch map 150 of the SONET-ADM apparatus A(1), the channel value "200" is registered into the transmission path switching information column of the SONET-ADM apparatus C(3) and the transmission path switching information column of the SONET-ADM apparatus D(4).

Also, the SONET-ADM apparatus B(2) is communicated with the SONET-ADM apparatus D(4) by using the channel "100". In this case, the SONET-ADM apparatus A(1) and the SONET-ADM apparatus D(4) are present on the signal transmission path defined from the SONET-ADM apparatus D(4) to the SONET-ADM apparatus B(2). Then, in the switch map 150 of the SONET-ADM apparatus B(2), the channel value "100" is registered into the transmission path switching information column of the SONET-ADM apparatus D(4) and the transmission path switching information column of the SONET-ADM apparatus A(1).

Furthermore, the SONET-ADM apparatus C(3) is communicated with the SONET-ADM apparatus A(1) by using the channel "200".

In this case, the SONET-ADM apparatus A(1) and the SONET-ADM apparatus B(2) are present on the signal transmission path defined from the SONET-ADM apparatus A(1) to the SONET-ADM apparatus C(3). Then, in the switch map 150 of the SONET-ADM apparatus C(3), the channel value "200" is registered into the transmission path switching information column of the SONET-ADM apparatus A(1) and the transmission path switching information column of the SONET-ADM apparatus B(2).

Figure 10:
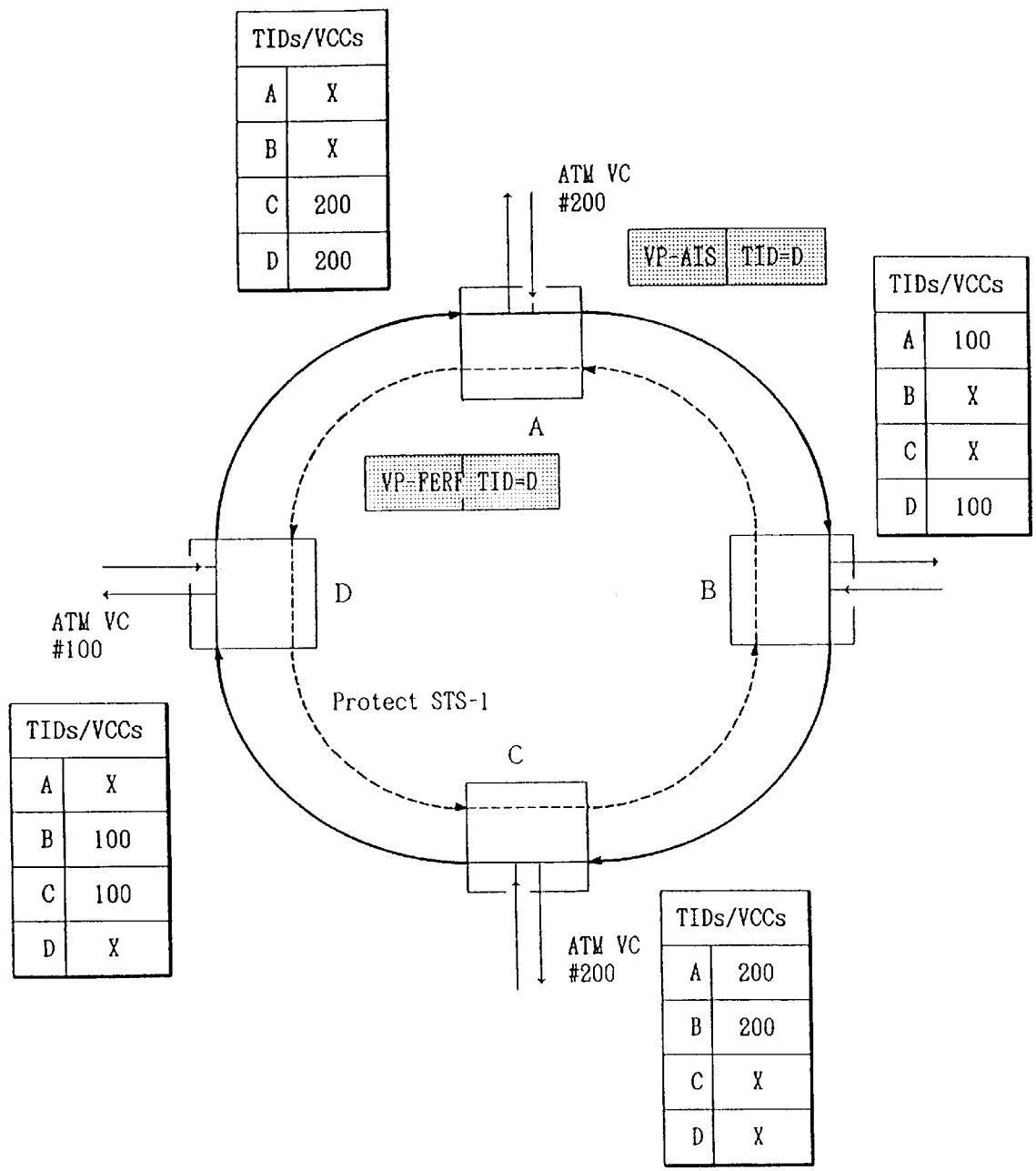
FIG. 10 indicates a concrete example of a switch map set on the SONET.

Also, the SONET-ADM apparatus D(4) is communicated with the SONET-ADM apparatus B(2) by using the channel "100". In this case, the SONET-ADM apparatus C(3) and the SONET-ADM apparatus B(2) are present on the signal transmission path defined from the SONET-ADM apparatus B(2) to the SONET-ADM apparatus D(4). Then, in the switch map 150 of the SONET-ADM apparatus D(4), the channel value "100" is registered into the transmission path switching information column of the SONET-ADM apparatus C(3) and the transmission path switching information column of the SONET-ADM apparatus B(2) (see FIG. 10).

Next, operations of the SONET-ADM apparatus during the normal communication will now be explained.

It should be noted that since the communication process operations related to the STS-1 and the DS-3 are similar to those of the prior art, explanations thereof are omitted.

When the signals are received from the optical fiber for the present operation system and the optical fiber for the spare operation system, in the SONET-ADM apparatus, the line interface units 5 and 10 convert the signals into signals at the STS-1 level which will then be entered into the cross-connect unit 9.

When the signal directed to the LAN is inputted into the cross-connect unit 9, this signal is entered into the tributary interface unit 8 for the LAN.

In the tributary interface unit 8 for the LAN, both the STS terminal unit 8*f* provided in the present operation system and the STS terminal unit 8*f* employed in the spare operation system receive the STS-1 signal outputted from the cross-connect unit 9 to derive the ATM cell mapped into the STS-1 signal, and notifies the ATM cell to the routing tag assembling/disassembling unit 8*e*.

First, the routing tag assembling/disassembling unit 8*e* of the present operation system detects the VCI from the header of the ATM cell to thereby judge the channel under use. Then, the routing tag assembling/disassembling unit 8*e* retrieves the VC table 160 using the detected channel as the keyword and refers to the pass through identification information. When "YES" is registered into the pass through identification information, such a routing tag having a destination to the routing tag assembling/disassembling unit 8*e* employed in the present operation system is assembled to be attached to the ATM cell. To the contrary, when "NO" is registered into the pass through identification information of the VC table 160, such a routing tag for designating a LAN is assembled to be attached to the ATM cell.

On the other hand, the routing tag assembling/disassembling unit 8*e* of the spare operation system detects the VCI from the header of the ATM cell to thereby judge the channel under use. Then, the routing tag assembling/disassembling unit 8*e* retrieves the VC table 160 using the detected channel as the keyword and refers to the pass through identification information. When "YES" is registered into the pass through identification information, such a routing tag having a destination to the routing tag assembling/disassembling unit 8*e* employed in the spare operation system is assembled to be attached to the ATM cell by the routing tag assembling/disassembling unit 8*e* of the spare operation system. To the contrary, when "NO" is registered into the pass through identification information of the VC table 160, such a routing tag for discarding the ATM cell is assembled to be attached to the ATM cell.

Furthermore, the routing tag assembling/disassembling unit 8*e* assembles such a routing tag directed to the OEM cell assembling/disassembling unit 8*g* and attaches this routing tag to the ATM cell when the received ATM cell is the OEM cell.

Next, when the ATM cells are inputted from the two routing tag assembling/disassembling unit 8*e*, the ATM routing device 8*d* refers to the routing tag of each ATM cell and switches the transfer route. Concretely speaking, in the case that either such information used to designate the routing tag assembling/disassembling unit 8*e* for the present operation system as a destination, or such information used to designate the routing tag assembling/disassembling unit 8*e* for the spare operation system as a destination is registered into the routing tag, the ATM routing device 8*d* returns the inputted ATM cell, and transfers the ATM cell to either the routing tag assembling/disassembling unit 8*e* for the present operation system, or the routing tag assembling/disassembling unit 8*e* for the spare operation system. Then, the routing tag assembling/disassembling unit 8*e* removes the routing tag from the ATM cell to enter the removed routing tag into the STS terminal unit 8*f*. The STS terminal unit 8*f* maps the ATM cell entered from the routing tag assembling/disassembling unit 8*e* into the STS-1 signal, and then input this STS-1 signal mapped by the ATM cell into the cross-connect unit 9. As a result, the ATM signal can pass through the own node.

When the LAN destination is registered into the routing tag of the inputted ATM cell, the ATM routing device 8*d* transfers this ATM cell into the routing tag assembling/disassembling unit 8*c*. As a consequence, the ATM cell can be dropped.

Furthermore, when the information used to discard the ATM cell is registered into the routing tag of the inputted ATM cell, the ATM routing device 8*d* discards this ATM cell.

Also, when such information for designating the OEM cell assembling/disassembling unit 8g as the destination is registered into the routing tag of the inputted ATM cell, the ATM routing device 8d transfers this ATM cell to the OAM cell assembling/disassembling unit 8g.

When the ATM routing device 8d drops the ATM cell, the routing tag assembling/disassembling unit 8c derives the routing tag from the ATM cell entered from the ATM routing device 8d and inputs the resulting ATM cell into the ATM cell assembling/disassembling unit 8b.

When the ATM cell is inputted from the routing tag assembling/disassembling unit 8c, the ATM cell assembling/disassembling unit 8b disassembles this ATM cell to be recovered into the original signal format responding to the LAN as the destination thereof. Then, the ATM cell assembling/disassembling unit 8b transfers the recovered signal to the LAN terminal unit 8a of the LAN as the destination.

As explained above, it is possible to handle the ATM in a similar service achieved for the STS-1 and DS-3 which have been handled in the conventional SONET.

Subsequently, a description will now be made of operations of the SONET-ADM apparatus when a failure happens to occur.

Figure 11:
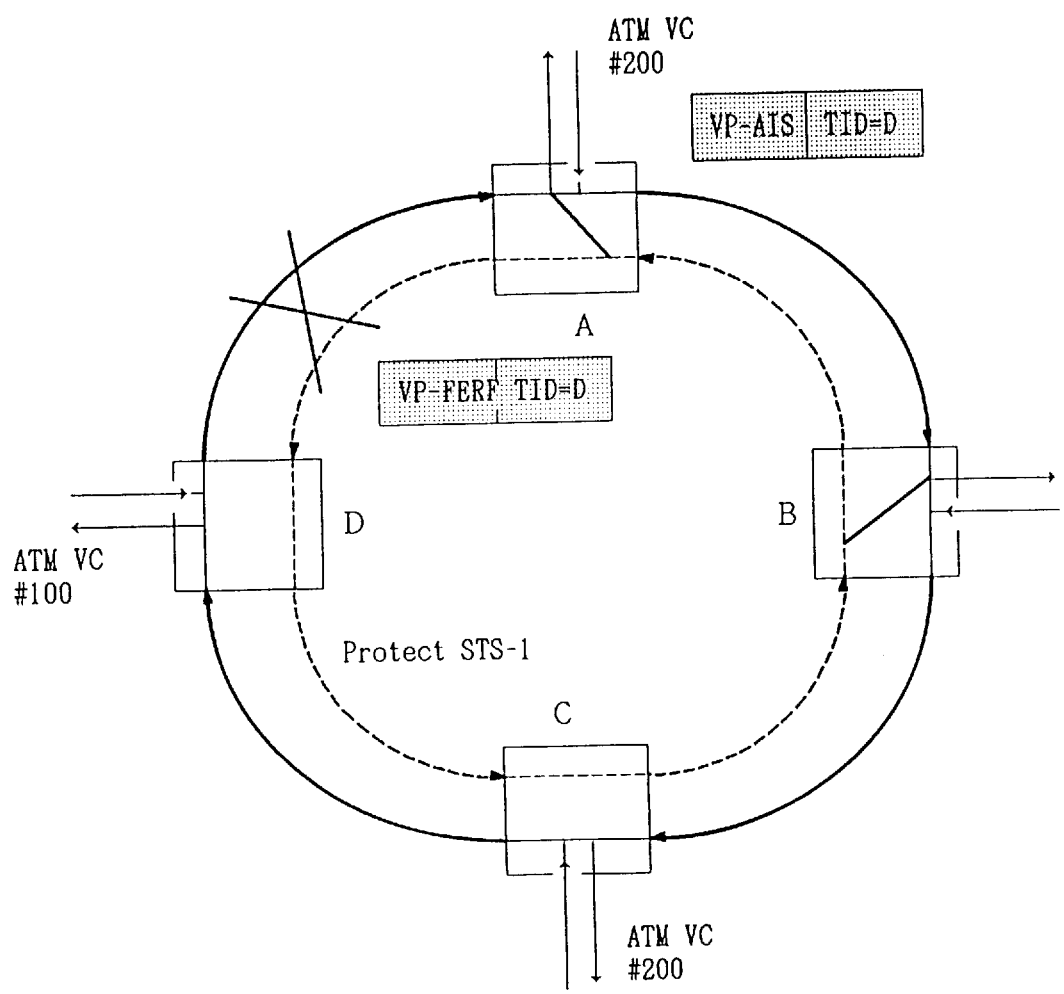
FIG. 11 schematically illustrates an execution example of a protection switch when a failure happens to occur.

In this case, as indicated in FIG. 11, a failure happens to occur in the optical fiber for the present operation system, defined between the SONET-ADM apparatus D(4) and the SONET-ADM apparatus A(1).

When the SONET-ADM apparatus A(1) receives the signal transmitted through the SONET-ADM apparatus D(4), the failure detecting unit 100 detects the insufficient synchronization of he ATM cell derived from the STS-1 signal in the STS terminal unit 8f of the tributary interface unit 8 for the LAN, and notifies to the failure occurrence notifying unit 110, such a fact that the failure happens to occur in the signal transmission path from the SONET-ADM apparatus D(4).

When the failure detecting unit 100 detects that the failure happens to occur on the signal transmission path from the SONET-ADM apparatus D(4), the failure occurrence notifying unit 110 notifies the TID of this SONET-ADM apparatus D(4) to the OAM cell assembling/disassembling unit 8g, and transmits the TID to the SONET. At this time, OAM cell assembling/disassembling unit 8g assembles the OAM cell containing the alarm display signal AIS, the OAM cell containing the remote terminal reception failure signal FERF to the up stream side of the optical fiber for the present operation system, and the OAM cell for the protection switch.

Then, OAM cell assembling/disassembling unit 8g inserts the OAM cell containing the alarm display signal AIS into the management channel of the optical fiber for the present operation system, and transmits this OAM cell to the down stream side (namely, in a direction of SONET-ADM apparatus B(2)). The OAM cell assembling/disassembling unit 8g inserts the OAM cell containing the remove terminal reception failure signal FERF into the management channel of the optical fiber for the spare operation system, and transmits this OAM cell to the up stream side (namely, in a direction of SONET-ADM apparatus D(4)). Moreover, the OAM cell assembling/disassembling unit 8g inserts the OAM cell for the protection switch into the management channel of the optical fiber for the present operation system, and then transmits this OAM cell to the down stream side.

Upon receipt of the OAM cell for the failure information and the OAM cell for the protection switch by the SONET-ADM apparatus B(2), the routing tag assembling/disassembling unit 8e of the tributary interface unit 8 for the LAN attaches to the received OAM cell such a routing tag that the OAM cell assembling/disassembling unit 8g is a destination thereof.

Then, the ATM routing device 8d transfers the OAM cell to the OAM cell assembling/disassembling unit 8g. The OAM cell assembling/disassembling unit 8g disassembles the transferred OAM cell so as to recover such a data format processable by the CPU, and notifies this data format to the CPU. At this time, the CPU executes the application program stored in the memory to thereby realize the transmission path switching unit 120. The transmission path switching unit 120 retrieves the switch map 150 by using the TID "D" indicative of the failure position as the keyword. In this case, with respect to the switch map 150 of the SONET-ADM apparatus B(2), the channel value "100" is stored into the transmission path switching information column of the SONET-ADM apparatus D(4), so that the transmission path must be switched. Thus, the transmission path switching unit 120 instructs the routing tag assembling/disassembling unit 8e of the spare operation system to change the content of the routing tag, so that the transmission path is switched. That is, the routing tag assembling/disassembling unit 8e of the spare operation system attaches to the received ATM cell, the same routing tag as that of the routing tag assembling/disassembling unit 8e for the present operation system. As a result, the SONET-ADM apparatus B(2) drops the ATM cell transmitted from the SONET-ADM apparatus D(4) from the optical fiber for the spare operation system.

When the OAM cell for the failure information and the OAM cell for the protection switch are received, the SONET-ADM apparatus C(3) initiates the transmission path switching unit 120 in a manner similar to that of the SONET-ADM apparatus B(2). The transmission path switching unit 120 retrieves the switch map 150 while using the TID "D" indicative of the failure position as the keyword. In this case, since no information is stored in the transmission path switching information column of the SONET-ADM apparatus D(4) in the switch map 150 of the SONET-ADM apparatus C(3), no transmission path is switched.

When the OAM cell for the failure information and the OAM ell for the protection switch are received, the SONET-ADM apparatus D(4) initiates the transmission path switching unit 120. The transmission path switching unit 120 retrieves the switch map 150 while using the TID "D" indicative of the failure position as the keyword. In this case, since no information is stored in the transmission path switching information column of the SONET-ADM apparatus D(4) in the switch map 150 of the SONET-ADM apparatus D(4), no transmission path is switched.

At the time when the occurrence of the failure is detected, the SONET-ADM apparatus A(1) initiates the transmission path switching unit 120, and retrieves the switch map 150 using the TID "D" representative of the failure position as the keyword. In this case, the channel value "200" is stored in the transmission path switching information column of the SONET-ADM apparatus D(4) in the switch map 150 of the SONET-ADM apparatus A(1), so that the transmission path requires to be switched. Thus, the transmission path switching unit 120 instructs the routing tag assembling/disassembling unit 8e of the spare operation system to change the content of the routing tag, so that the transmission path is switched. That is, the routing tag assembling/disassembling unit 8e of the spare operation system attaches to the received ATM cell, the same routing tag as that of the routing tag assembling/disassembling unit 8e for the present operation system. As a result, the SONET-ADM apparatus A(1) drops the ATM cell transmitted from the SONET-ADM apparatus C(3) from the optical fiber for the spare operation system.

As previously described, according to this embodiment, it is possible to provide the service for the ATM cell in addition to the conventional service in the SONET, and also to provide the protection switch corresponding to the ATM cell in this SONET.

In accordance with the present invention, it is possible to provide the service for the fixed length cell such as the ATM cell in addition to the conventional service, as well as to provide the protection switch corresponding to the fixed length cell in the communication networks such as the SONET.

What is claimed is:

1. An add/drop multiplexing apparatus for supporting a fixed length cells, comprising:

an input unit for inputting multiplexed signals transmitted over a transmission path;

a cross-connect unit for deriving a signal from the multiplexed signals inputted by the input unit;

a tributary interface unit for converting the signal derived by said cross-connect unit into a signal having such a format corresponding to a low-ordered communication network;

wherein said tributary interface unit converts a fixed length cell received from said low-ordered communication network into a signal format processable by said cross-connect unit, and also converts the signal delivered from said cross-connect unit into a fixed length cell so as to be transmitted to said low-ordered communication network; and wherein said tributary interface unit includes:
 a VC table for registering therein a virtual channel used by said low-ordered communication network;
 a signal terminal unit for converting the signal derived from said cross-connect unit into the fixed length cell;
 a routing tag assembling unit for deriving a virtual channel discriminator from a header portion of the fixed length cell outputted from said signal terminal unit, for comparing the derived virtual channel discriminator with the virtual channel registered in said VC table, and for adding a routing tag indicative of said low-ordered communication network as a destination to said fixed length cell when both of said channels are coincident with each other;
 a routing device for investigating the routing tag of the fixed length cell outputted from said routing tag assembling unit so as to judge whether or not the destination of said fixed length cell is said low-order communication network, for transferring said fixed length cell to said low-ordered communication network when the destination of said fixed length cell is said low-ordered communication network, and for returning said fixed length cell to said routing tag assembling unit when the destination of said fixed length cell is not said low-ordered communication network; and
 a routing tag disassembling unit for removing the routing tag from the fixed length cell transmitted from said routing device to said low-ordered communication network.

2. An add/drop multiplexing apparatus for supporting a fixed length cell as claimed in claim 1, wherein:

when the fixed length cell is returned from said routing device, said routing tag assembling unit removes the routing tag from said fixed length cell, and returns the fixed length cell whose routing tag has been removed to said cross-connect unit.

3. An add/drop multiplexing apparatus for supporting a fixed length cell as claimed in claim 1, wherein:

while a plurality of said add/drop multiplexing apparatuses are connected by way of a transmission path for a present operation system and a transmission path for a spare operation system in a ring shape to constitute a communication network, each of said add/drop multiplexing apparatuses is comprised of:
 a signal terminal unit/a routing tag assembling unit used for said transmission path for the present operation system; and
 a signal terminal unit/a routing tag assembling unit used for said transmission path for the spare operation system;
 when such a fixed length cell for designating said low-ordered communication network as a destination is inputted from the signal terminal unit used for the transmission path for said present operation system, said routing tag assembling unit used for the transmission path for the present operation system attaches such a routing tag for indicating the low-ordered communication network as the destination to said fixed length cell;
 when such a fixed length cell for designating said low-ordered communication network as a destination is inputted from the signal terminal unit used for the transmission path for said spare operation system, said routing tag assembling unit used for the transmission path for the spare operation system attaches to said fixed length cell such a routing tag for indicating that said fixed length cell is discarded to said fixed length cell; and
 said routing device transfers the ATM cell inputted from the routing tag assembling unit used for the transmission path for the present operation system to said low-ordered communication network, and also discards the ATM cell entered from the routing tag assembling unit used for the transmission path for the spare operation system.

4. An add/drop multiplexing apparatus for supporting a fixed length cell as claimed in claim 3, wherein:

each of said add/drop multiplexing apparatuses includes a ring topology map for recording said add/drop multiplexing apparatus for constituting said communication network along the transmission direction of said transmission path.

5. An add/drop multiplexing apparatus for supporting a fixed length cell as claimed in claim 3, further comprising:

a switch map for registering such information used to identify whether or not the present operation system needs to be switched by the spare operation system when a failure happens to occur in each of said add/drop multiplexing apparatuses with respect to each of add/drop multiplexing apparatus identification information used to identify said respective add/drop multiplexing apparatuses.

6. An add/drop multiplexing apparatus for supporting a fixed length cell as claimed in claim 4, wherein:

each of said add/drop multiplexing apparatuses include:
 a failure detecting unit for judging that a failure happens to occur in such an add/drop multiplexing apparatus located on a down stream side among the adjoining add/drop multiplexing apparatuses when said failure detecting unit detects an insufficient synchronization of the fixed length cell received by said tributary interface unit, and refers to said ring topology map;

a failure occurrence notifying unit for transmitting to said communication network, an OAM cell for recording therein add/drop multiplexing identification information used to specify the add/drop multiplexing apparatus located on the down stream side when said failure detecting unit judges that the failure happens to occur in said add/drop multiplexing apparatus on the down stream side; and a transmission path switching unit for deriving the add/drop multiplexing apparatus identification information from said OAM cell when the OAM cell transferred from another add/drop multiplexing apparatus, for retrieving said switch map while using said add/drop multiplexing apparatus identification information as a keyword, and for substituting a content of a routing tag assembling unit used in the transmission path for the present operation system for a content of a routing tag assembled by said routing tag assembling unit used in the transmission path for the spare operation system.

7. An add/drop multiplexing apparatus for supporting a fixed length cell as claimed in claim 5, wherein:

each of said add/drop multiplexing apparatuses include:

a failure detecting unit for judging that a failure happens to occur in such an add/drop multiplexing apparatus located on a down stream side among the adjoining add/drop multiplexing apparatuses when said failure detecting unit detects an insufficient synchronization of the fixed length cell received by said tributary interface unit, and refers to said ring topology map;

a failure occurence notifying unit for transmitting to said communication network, an OAM cell for recording therein add/drop multiplexing identification information used to specify the add/drop multiplexing apparatus located on the down stream side when said failure detecting unit judges that the failure happens to occur in said add/drop multiplexing apparatus on the down stream side; and a transmission path switching unit for deriving the add/drop multiplexing apparatus identification information from said OAM cell when the OAM cell transferred from another add/drop multiplexing apparatus, for retrieving said switch map while using said add/drop multiplexing apparatus identification information as a keyword, and for substituting a content of a routing tag assembling unit used in the transmission path for the present operation system for a content of a routing tag assembled by said routing tag assembling unit used in the transmission path for the spare operation system.

\* \* \* \* \*